(Model.)
R. W. JONES.
FEED WATER HEATER AND PURIFIER.
No. 257,338. Patented May 2, 1882.
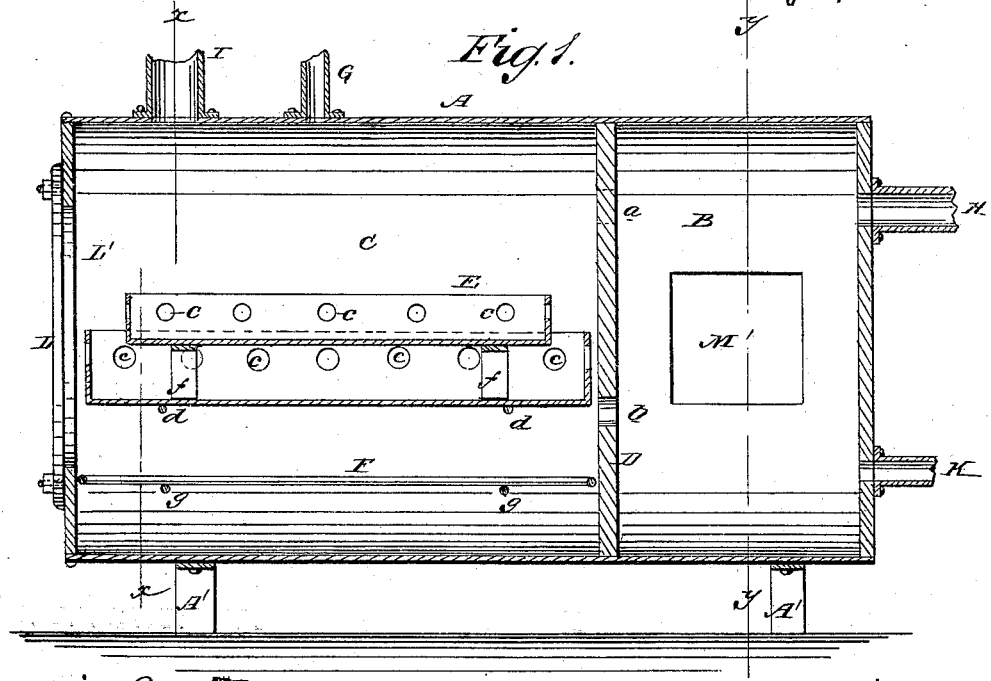
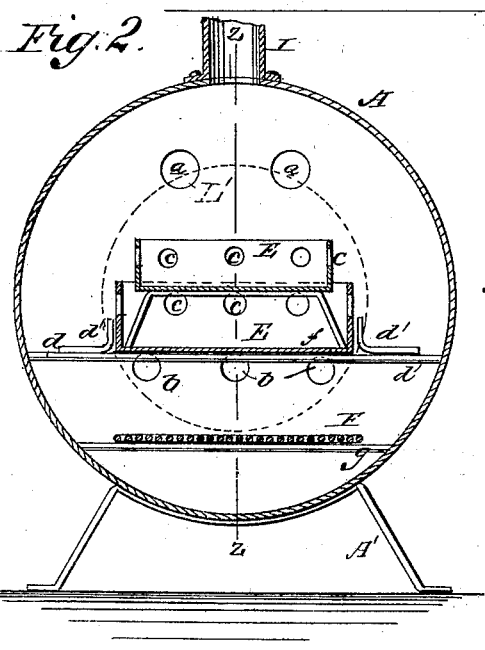
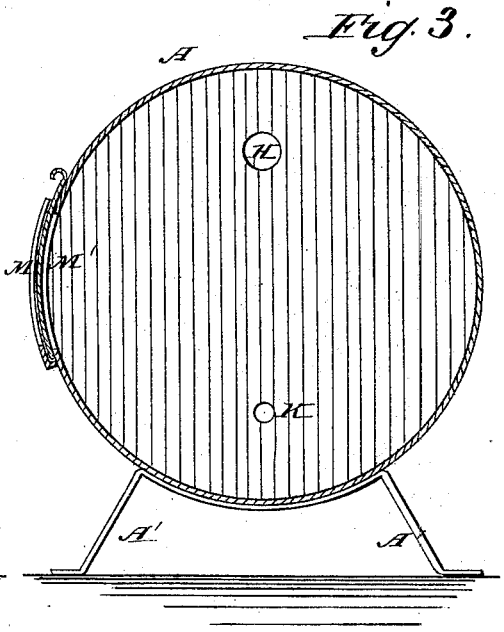
WITNESSES:
Francis McArdle
C. Sedgwick
INVENTOR:
R. W. Jones
BY Munn & Co
ATTORNEYS.

UNITED STATES PATENT OFFICE.

ROBERT W. JONES, OF LONDON, OHIO.

FEED-WATER HEATER AND PURIFIER.

SPECIFICATION forming part of Letters Patent No. 257,338, dated May 2, 1882.

Application filed August 19, 1881. (Model.)

*To all whom it may concern:*

Be it known that I, ROBERT W. JONES, of London, in the county of Madison and State of Ohio, have invented certain useful Improvements in Feed-Water Heaters and Purifiers, of which the following is a specification.

This invention relates to that class of devices that are designed for purifying as well as heating the feed-water for a boiler.

The invention consists of a cylinder divided by a perforated diaphragm into two communicating chambers, one of which—the main heating and purifying chamber—contains a series of pans, set one above the other, while below the pans are fixed one or more gratings, it being designed that the feed-water entering above the pans shall become heated by the exhaust-steam and deposit most of its lime and sediment upon the pans and gratings, and then flow through the diaphragm to the auxiliary chamber to be further heated and purified before discharge therefrom, all of which will be hereinafter described.

Figure 1 is a longitudinal sectional elevation of the improved device on line $z\ z$, Fig. 2. Fig. 2 is a vertical sectional end elevation on line $x\ x$, Fig. 1. Fig. 3 is a vertical sectional end elevation on line $y\ y$, Fig. 1.

Similar letters of reference indicate corresponding parts.

In the drawings, A represents a horizontal cylinder divided into two chambers, B C, by a vertical diaphragm, D, that has near its top orifices $a\ a$, for the passage of exhaust-steam from the chamber B to the chamber C, and below its center with orifices $b\ b$, for the flow of water from the chamber C to the chamber B.

In the chamber C two or more pans, E, having perforated sides, as shown at $c$, are set one above the other, the lower pan E resting preferably on cross-bars $d$, and held in place by braces $d'$, and the other supported in the lower pan E on feet $f$. Below these pans E a grating, F, is supported on cross-bars $g$.

It is designed that the feed-water from a suitable source of supply shall enter the chamber C through the pipe G in the top of the cylinder A, and that the exhaust-steam from the engine (not shown) shall enter through pipe H in the end of the cylinder A into the chamber B, and thence through the orifices $a\ a$ into the chamber C, to escape finally through the pipe I in the top of said chamber C, so that as the feed-water enters said chamber C said water becomes heated by the exhaust-steam, and falling from one pan E to the other through the perforations $c$, and thence upon and through the gratings F, thereupon deposits the greater portion of the lime held in suspension or solution, while at the same time a portion of the sediment in the water is deposited by gravity in the bottom of said chamber C. The water, thus nearly purified by being heated and brought in contact with the pans and gratings E F, upon which to deposit scale, then flows through the orifices $b\ b$ into the auxiliary purifying and heating chamber B, where it becomes further heated by the exhaust-steam entering through the pipe H, and where, consequently, it deposits more of its scale and sediment; and from this chamber B the heated and purified feed-water is taken to supply the boiler (not shown) through the pipe K.

In the head of the chamber C is a manhole, L', covered by a plate, L, whereby access may be had to the said chamber C for removing the scale and sediment from it, and for removing and cleaning the pans E; and in the side of the chamber B is a doorway, M', closed by a door, M, through which said chamber B can be cleaned.

The cylinder A preferably rests in a horizontal position on supports A'. Preferably galvanized iron is used for the cylinder A, as being more durable and cheaper than other metal, and at the same time of sufficient strength.

Having thus described my invention, I claim as new and desire to secure by Letters Patent—

1. An improved feed-water heater and purifier consisting of a cylinder divided into two unequal chambers by a vertical perforated partition, the smaller one of which is provided with the exhaust and water exit pipe, and the larger one with steam and water supply pipes, and with sediment-collecting pans having perforated sides arranged one above the other, and a grating below the said pans, substantially as and for the purpose set forth.

2. In a feed-water heater and purifier, the combination, with the cylinder A, provided with the vertical partition D, of the purifying-chamber C, provided with the pans E, having perforated sides and placed one above the other, and the grating F, arranged below said pans, substantially as and for the purpose set forth.

ROBERT W. JONES.

Witnesses:
W. B. HAMILTON,
WM. IRWIN.